United States Patent [19]
Swartz et al.

[11] Patent Number: 6,095,418
[45] Date of Patent: Aug. 1, 2000

[54] APPARATUS FOR PROCESSING SYMBOL-ENCODED DOCUMENT INFORMATION

[75] Inventors: Jerome Swartz, Oakfield; Raj Bridgelall, Mt. Sinai; Ron Goldman, Westbury; Eugene Joseph, Coram; Joseph Katz, Stony Brook, all of N.Y.

[73] Assignee: Symbol Technologies, Inc., Bohemia, N.Y.

[21] Appl. No.: 08/187,290

[22] Filed: Jan. 27, 1994

[51] Int. Cl.⁷ ..................................................... G06K 07/01
[52] U.S. Cl. ................................. 235/462.01; 235/462.01
[58] Field of Search ...................... 235/380, 462, 235/472, 432, 375, 462.01; 434/115, 116, 114, 335, 334, 313, 311

[56] References Cited

U.S. PATENT DOCUMENTS

| | | | |
|---|---|---|---|
| 3,883,146 | 5/1975 | Johnson et al. | 434/116 |
| 4,337,375 | 6/1982 | Freeman | 235/472 |
| 4,425,099 | 1/1984 | Naden | 434/335 |
| 4,488,679 | 12/1984 | Bockholt et al. | 235/472 X |
| 4,731,525 | 3/1988 | Hice | 235/472 |
| 5,159,635 | 10/1992 | Wang | 380/51 |
| 5,304,786 | 4/1994 | Pavlidis et al. | 235/462 |
| 5,387,783 | 2/1995 | Mihm et al. | 235/375 |

FOREIGN PATENT DOCUMENTS

| | | | |
|---|---|---|---|
| 2494873 | 11/1980 | France | 235/462 |
| 1259380 | 5/1985 | Japan | 235/472 |

OTHER PUBLICATIONS

E. Uberbacher, "ReadyWrite Stylus", IBM Technical Disclosure Bulletin, Jun. 1976 pp. 177–178.

J. T. Powers, "Text Publishing and Reading System for the Handicaped", IBM Technical Disclosure Bulletin, Nov. 1977, pp. 2421–2422.

*Primary Examiner*—Thien M. Le
*Attorney, Agent, or Firm*—Finnegan, Henderson, Farabow, Garrett & Dunner, L.L.P.

[57] ABSTRACT

Document information is encoded in a graphic symbol applied to the document. The symbol is read to retrieve the document information which is then translated into a humanly discernible form different from that appearing on the document. In one embodiment of the invention, a symbol is applied to sheet music and encoded with the music score printed thereon. The symbol can then be read to produce an audio rendition of the music score. Also, a symbol can be applied to a printed text page and text encoded. The symbol can then be read to produce a vocal reading of the text. Other applications using encoded symbols to uniquely identify or memorialize persons named on credit cards and business cards are disclosed.

10 Claims, 4 Drawing Sheets

APPARATUS FOR PROCESSING SYMBOL-ENCODED DOCUMENT INFORMATION

REFERENCE TO RELATED APPLICATIONS

This application is related to the application of Ynjiun R. Wang, et al., Application Ser. No. 07/461,881, filed Jan. 5, 1990, and entitled "Non-Volatile Electro-Optical Read-Only Memory in High Density Dimensional Symbology"; to the application of Li, et al., Ser. No. 08/123,955, filed Sep. 20, 1993, and entitled "Apparatus for Processing Human-Readable and Machine-Readable Documents"; and Ynjiun P. Wang et al. Application Ser. No. 07/891,742, filed Jun. 1, 1992 and entitled "Record with Encoded Data". The disclosures of these related applications are incorporated herein by reference.

BACKGROUND OF THE INVENTION

1. Field of the Invention

The present invention relates to the use of machine-readable symbols with high information density and capacity for recording document information, and more particularly to the reproduction of such document information in a unique form.

2. Description of the Prior Art

Encoded symbols, such as the well-known UPC bar code symbol, have gained wide use in many industries as a tool to increase speed and accuracy of data capture in a vast number of diverse applications, such as point-of-sale item pricing, inventory control, article tracking, and so on.

The traditional bar code symbols are quite limited, however, in the amount of encoded data or information they can contain. Thus, in many applications, the bar code symbol borne by an item is simply an address to a database where information regarding the item is stored, such as a plain language descriptor of the item, price, etc.

The above-cited, related application Ser. No. 07/461,881 discloses a two dimensional bar code symbol which has high information density and capacity capabilities. This symbol, known as the PDF417 bar code symbol, can serve as a portable data file containing all the information necessary to identify and describe the item to which it is applied. In fact, the PDF417 symbol has sufficient information density and capacity to represent as many as 500 characters per square inch of ASCII data. Thus, a relatively small number of PDF417 symbols, and in some cases a single PDF417 symbol can be encoded with alphanumeric text filling a letter-size document, as disclosed in the above-cited, related application Ser. No. 08/123,955.

SUMMARY OF THE INVENTION

The present invention is directed to apparatuses and methods for processing machine-readable symbols applied to a variety of human-readable documents and encoded with information pertaining to the documents. The document symbol is optically scanned and decoded to symbol data, and the symbol data is then translated into a humanly discernible form different from the information format appearing on the document.

In accordance with one embodiment of the invention, symbols applied to pages of sheet music are encoded to represent the musical score printed on the sheet music pages, The symbols, encoded in the well-known musical instrument digital interface (MIDI) format, for example, are scanned and decoded to symbol data. A translator then translates the symbol data to MIDI data which is fed to an MIDI musical system to produce an audio rendition of the musical score in the sound of a selected musical instrument or instruments.

In another embodiment of the invention, symbols applied to pages of printed text such as pages of a book are encoded to represent the printed text or as phonetic representations of the printed text. The symbols are then scanned, decoded to symbol data, and translated to phonetic code. The phonetic code is then converted to a voice reading of the printed text for the benefit of users, such as the blind.

According to a further embodiment of the invention, a symbol is applied to a credit card and encoded with image data representing the signature of the authorized card holder. The symbol is then scanned, decoded to symbol data, and translated to image data which is used to generate a display of the authorized card holder's signature. The displayed signature is then compared with the signature executed by a person presenting the card for a credit purchase to verify that the person presenting the card is the authorized card holder.

Alternatively, the symbol may be encoded with biometric data, such as pen pressure, stroke velocity and direction, etc., extracted during signature execution by the authorized card holder. Then, at the time of a credit purchase, the symbol-encoded biometric data is compared with corresponding biometric data extracted during signature execution by the card presenter to verify that the authorized card holder and the card presenter are the same person.

In yet another embodiment of the present invention, symbols are applied to business cards and pre-encoded with data regarding the persons named on the cards. Such data may include the person's phone number, such that a machine reading the symbol may be utilized to automatically initiate a phone call to the named person. Alternatively or in addition, the card symbol may be encoded with image and/or phonetic data, which can be retrieved and displayed to portray a visual likeness of the named person or converted to a voice pronunciation of the person's name.

Additional features and advantages of the present invention will be set forth in the description which follows and in part will be apparent from the description, or may be learned by practice of the invention. The objectives and other advantages of the invention will be realized and obtained by the apparatuses particularly pointed out in the detailed description and appended claims, as well as in the accompanying drawings.

It is to be understood that both the foregoing general description and the following detailed description are intended to provide further explanation of the invention as claimed.

The accompanying drawings are included to provide further understanding of the invention and are incorporated in and constitute a part of the specification, illustrate several embodiments of the invention and together with the specification serve to explain the principles of the invention.

DETAILED DESCRIPTION OF PREFERRED EMBODIMENTS

Introduction

Figure 1:
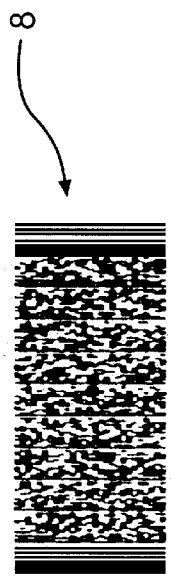
FIG. 1 is a block diagram illustrating apparatus constructed in accordance with one embodiment of the present invention.

The various embodiments of the present invention are predicated on the use of a high information density and capacity bar code symbol, such as, for example, the two-dimensional bar code symbol disclosed in the cited application Ser. No. 07/461,881. An example of this symbol, known as the PDF417 symbol, is illustrated at 8 in FIG. 1. According to the present invention, symbols 8 are applied to documents and encoded with various kinds of data representing document information. The document information, when retrieved from the symbols, is translated to a desired format for presentation in a humanly intelligible form different from the form contained by the document. It should be noted that throughout this application, wherever a PDF417 symbol is used, a single symbol may be replaced by multiple symbols when capacity requirements for a particular application exceed that of a single symbol.

Symbol-Encoded Sheet Music

Figure 2:
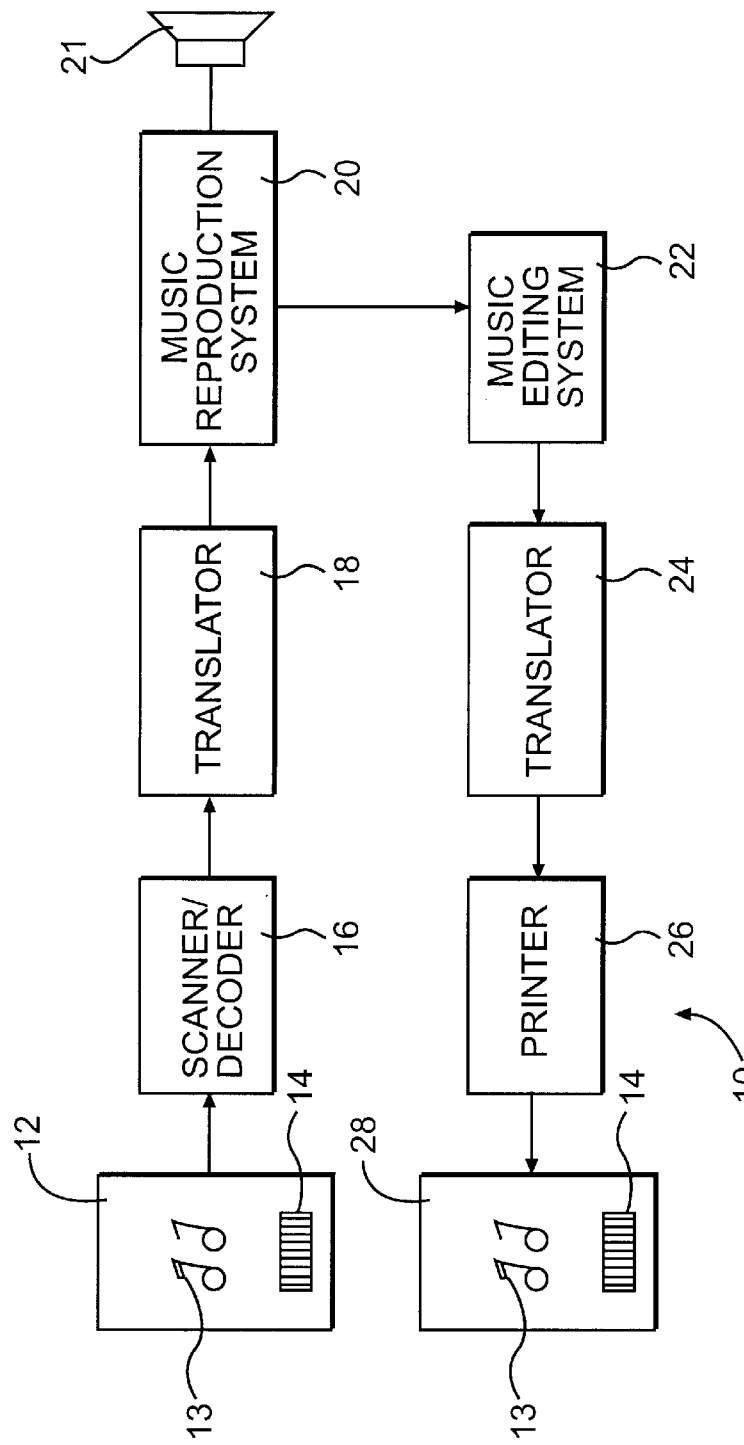
FIG. 2 is an illustration of an exemplary two-dimensional bar code symbol having utility in the present invention.

In accordance with the embodiment of the present invention illustrated in FIG. 2, a high information density and capacity symbol, such as a PDF417 two-dimensional bar code symbol, is encoded with the musical score printed on a page of sheet music. The symbol is encoded with music data in a form that is compatible with an electronic music system, such as a Musical Instrument Digital Interface (MIDI) system. MIDI is a standard protocol for the exchange of music data between computers, musical instruments and synthesizers. MIDI defines binary codes representing a musical score, including information representing the start of a note, as well as its pitch, length, volume, and musical attributes, such as vibrato. MIDI codes can also be used to indicate a particular musical instrument or instruments.

FIG. 2 illustrates apparatus, generally indicated at 10, for facilitating entry of a musical score, printed on sheet music, into an MIDI system having a computer or similar processor programmed to edit and play an audio rendition of the musical score. Thus, a page 12 of sheet music has a music score 13 and a symbol 14 printed thereon. The symbol is preferably a two-dimensional bar code symbol, such as a PDF417, encoded to represent music score 13 in MIDI code, which may be in compressed form.

Symbol 14 is optically scanned and decoded into symbol data by a scanner/decoder 16. A suitable scanner/decoder is disclosed in commonly assigned U.S. patent application Ser. No. 07/851,493, filed Mar. 16, 1992 and entitled "Method and Apparatus for Decoding Two-Dimensional Bar Code Using CCD/CCM Camera." A suitable laser beam scanner/decoder is disclosed in commonly assigned U.S. patent application Ser. No. 07/851,505, filed Mar. 16, 1992 and entitled "System for Encoding and Decoding Data in Machine Readable Graphic Form".

A translator 18 then translates the symbol data into standard MIDI code, including MIDI binary code words, using a standard decompression algorithm. The standard MIDI code is then fed to a MIDI music reproduction system 20 which may include, for example, a look-up table that, in response to MIDI codes, instructs the system to generate particular tones of particular durations, frequencies, amplitudes and timbre. The MIDI music reproduction system 20 thus produces an audio rendition, as illustrated diagrammatically by speaker 21, of the musical score printed on music sheet 12 in the synthesized sound of a designated one or more musical instruments.

Apparatus 10 can also include a standard music editing system 22, which allows a user to edit the music by editing the MIDI code. For example, the rhythm of the music can be changed by editing timing codes in the MIDI data or a rendition can be transposed from B-major to D-major. Music editing system 22 outputs a musical score in MIDI code form to a translator 24. This translator converts the MIDI code to symbol data and to music print data. Printer 26 then prints the symbol data as symbol 14 and the music print data as music score 13 on a new music sheet 28. Alternatively, symbol 14 may be printed on a label which is then adhered to music sheet 28.

The apparatus 10 of FIG. 2 thus enables convenient and faithful translation of printed musical scores to the musical sounds they represent. This is especially useful for individuals who cannot read music. For example, MIDI symbol codes can be printed in music instruction books to enable a student to hear how a printed musical score should sound. In addition, collaborating musicians in separate locations can readily send musical scores to each other by facsimile transmission of symbols 14 or data transmissions of MIDI symbol codes for convenient musical reproduction and editing.

Symbol-Encoded Books

Figure 3:
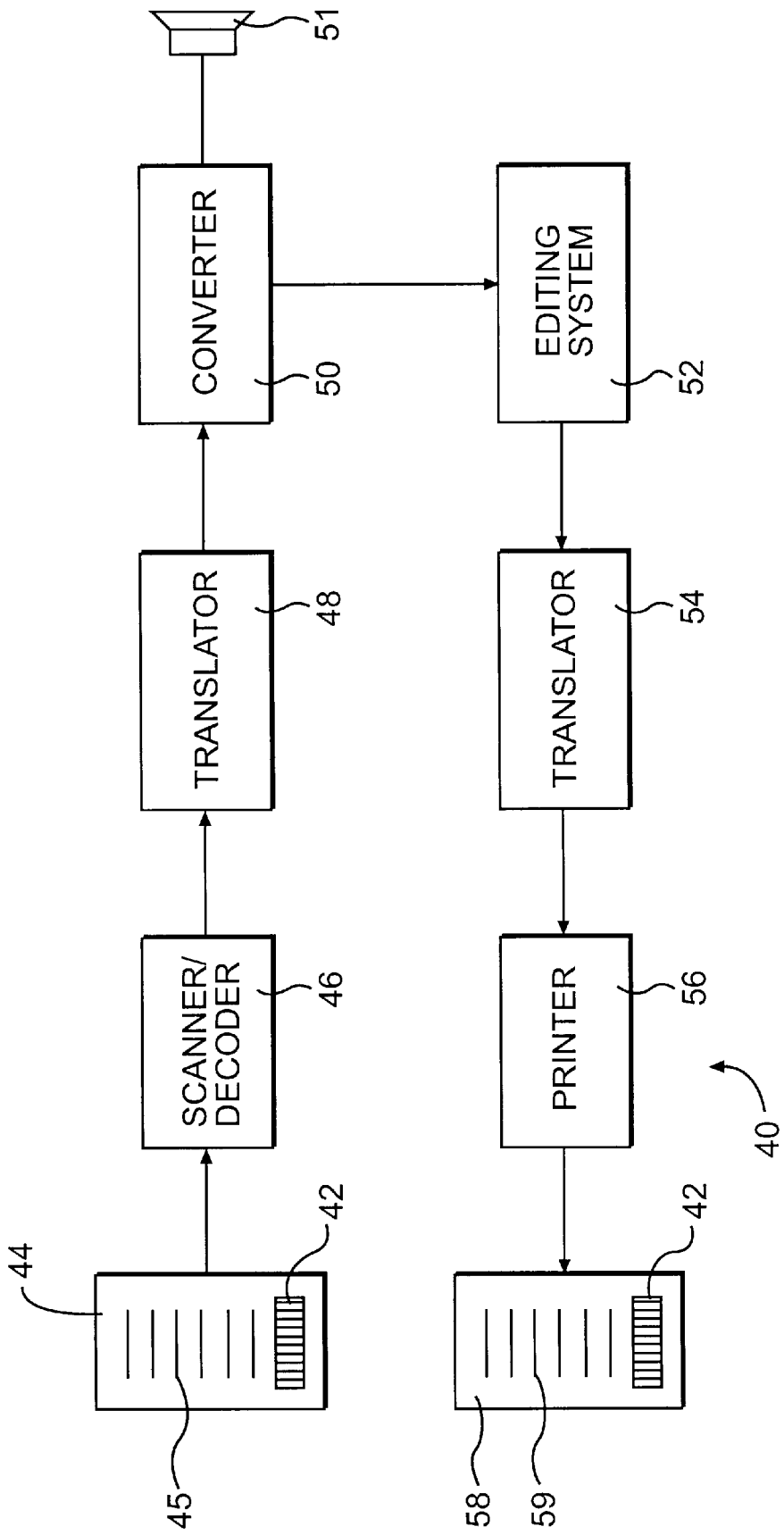
FIG. 3 is a block diagram illustrating apparatus constructed in accordance with an additional embodiment of the present invention.

FIG. 3 illustrates another embodiment of the invention, wherein bar code symbols, such as PDF417 symbols, are printed on pages of a book and pre-encoded to represent the printed text on the book pages. Thus, as seen in FIG. 3, a symbol 42 is printed on a book page 44 together with alphanumeric text 45. Symbol 42 is encoded to represent the printed text in alphanumeric code, such as ASCII code, or to represent phonetic data of the sounds of the printed text when read aloud. Phonetic data uses less symbol area and can be more conveniently converted to voice than ASCII code.

The apparatus 40 of FIG. 3 also includes a scanner/decoder 46 for scanning and decoding symbol 42 to symbol data. A translator 48 translates the symbol data into phonetic data (or ASCII data) which is then fed to a converter 50 for conversion to voice analog signals reproduced by speaker 51. This conversion can be performed, for example, by using a look-up table to convert phonetic code words into synthesized vocal sounds which are compiled into spoken words representing a reading of the printed text. If the symbols are encoded in ASCII code, converter 50 converts the ASCII code to a synthesized voice reading of the printed text.

As also illustrated in FIG. 3, the phonetic data or ASCII data can also be fed to an editing system 52 where the data can be stored, edited, displayed, or transmitted to a remote location. To print symbol 42, editing system 52 generates phonetic or ASCII data to a translator 54 for conversion to symbol data. A printer 56 then prints symbols 42 on book pages 58. Translator 54 and printer may also be equipped to print the appropriate text 59 on the book pages in conjunction with the symbol 42 in a combined operation.

By virtue of this embodiment of the invention, the blind gain access to books by being able to listen to a synthesized voice reading of a book derived from the symbols printed on the book pages. This approach will also benefit persons learning to read. Invisible ink can also be used to print the symbols, thus rendering them unobtrusive.

It will be appreciated that the apparatus of FIG. 3 may also be used for encoding the symbols with drawing data created by computer aided design (CAD) programs. In this approach, a scanner reads and decodes the symbols printed on the drawing sheets to symbol data, and the symbol data is then translated into a drawing data format compatible with a CAD system. The drawings can then be read by the CAD system and manipulated, revised, etc., in the same manner as standard CAD files. When the CAD system prints out a new drawing on a clean sheet, the stored CAD data is converted to symbol code. That code can later be used to generate a printout on the drawing sheet of a symbol encoded to represent of the new edited drawing.

Symbol-Encoded Signature Information

Figure 4:
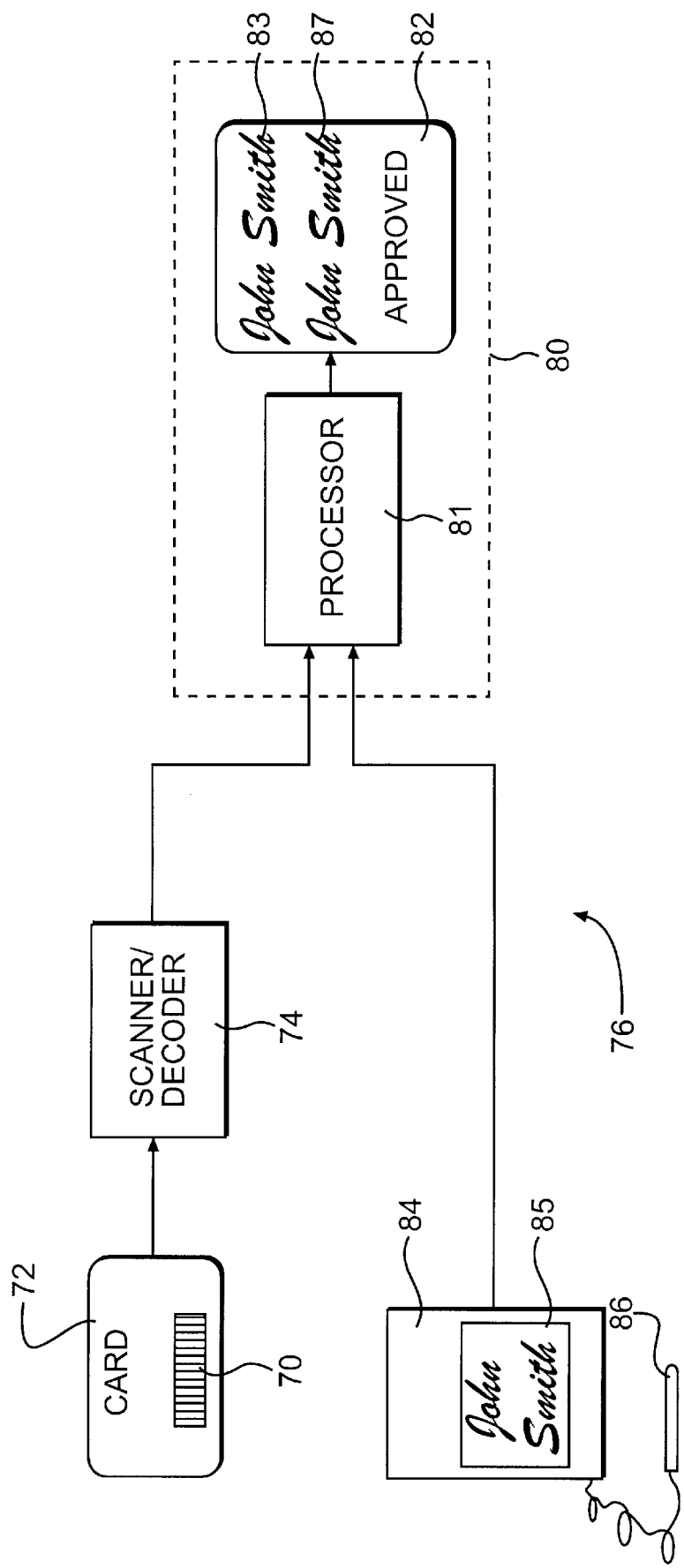
FIG. 4 is a block diagram illustrating apparatus constructed in accordance with another embodiment of the present invention.

In the embodiment of the invention seen in FIG. 4, a symbol, such as a PDF417 bar two-dimensional code symbol, is encoded with signature information. This signature information is encoded in the symbol in a suitable format, such as a bit-mapped representation of a signature. The signature-encoded symbol 70 is printed on or otherwise affixed to a credit card 72 or other instrument or document. Although the credit card bears the printed name of the authorized card holder, the card holder's signature will not appear on the card.

When a customer desires to make a purchase using credit card 72, the credit card is presented to a sales person. The signature-encoded symbol 70 on credit card 72 is then scanned and decoded to symbol data by a scanner/decoder 74 included in signature capture and verification apparatus 76 of FIG. 4. Scanner/decoder 74 may be constructed in the manner taught in the above-cited U.S. patent application Ser. No. 07/851,505.

The symbol data is fed to a computer 80 which includes a processor 81 and a display screen 82. Processor 81 converts the symbol data into a bit-mapped representation of the signature the authorized holder of credit card 72 using a suitable conversion algorithm. The bit-mapped signature data is then displayed on screen 82 as an image 83 of the authorized cardholder's signature.

Apparatus 76 also includes a pen-based computer 84 which includes a scratch pad 85 and an electronic pen 86. In practice, computer 80 and pen-based computer 84 may comprise a single computer system. For example, the functions of computers 80 and 84 may be implemented using a Portable Data Terminal (PDT) 330, produced by Symbol Technologies, Inc., assignee of this application, combined with an Advanced Function Technology (AFT) pen based subsystem, produced by Calcomp, of Scotsdale, Ariz.

The customer executes his or her signature 87 on scratch pad 85 using electronic pen 86. The pen-based computer 84 captures the signature in a suitable data format. The captured signature is transmitted to computer 80 and displayed on screen 82, as indicated at 87, in juxtaposition with the displayed signature 83 of the authorized card holder derived from symbol 70. The sales person can then visually compare the two signatures to determine the authenticity of the customer's signature. If the two signatures do not appear substantially alike, credit card 72 is not accepted. In this embodiment, the authorized card holder's signature would not appear on credit card 72, so a person attempting to use a lost or stolen credit card would be unable to determine the authorized card holder's signature, making forgery more difficult.

Alternatively, computer can be programmed, using a signature recognition algorithm to electronically compare the authorized card holder's signature and the customer's signature. The results of this electronic comparison will then be displayed on screen 82, such as by displaying the word "Approved" if the two signatures favorably compare or the word "Disapproved" if the two signatures do not.

If approval is based on a visual comparison of the authorized card holder's signature and the customer's signature by a sales person, pen-based computer 84 may be eliminated.

Rather than encoding symbol 70 with image data of the authorized card holder's signature, the symbol may be encoded with biometric data uniquely identifying the authorized card holder's signature. This biometric data may include pen pressure, stroke velocity and direction, and duration. Corresponding biometric data is then extracted from the customer's signature when executed on the scratch pad of pen-based computer 84 using electronic pen 86. Computer 80 then electronically compares the biometric data of the authorized card holder's signature encoded in symbol 70 with the biometric data extracted from the customer's signature to determine whether the pending credit card purchase should be approved or disapproved.

Alternatively, rather than encoding symbol 70 with signature data, the symbol may be encoded with other biometric data, such as pictorial data, retinal eye pattern data, fingerprint data, handprint data, etc., that uniquely identifies the authorized card holder. These alternatives would require other forms of hardware to capture identity data, such as a video camera, retinal scanner, fingerprint or handprint scanner, etc. If the symbol is encoded with pictorial data of the authorized card holder's face, the symbol 70 would be scanned and decoded to symbol data. The symbol data would then be converted to image data to display a likeness of the authorized card holder on screen 82. The sales person can then determine if the displayed image is a reasonable likeness of the customer.

Alternatively, the authorized card holder's pictorial image derived from symbol 70 may be electronically compared with a pictorial image of the customer taken by a video camera. If the identification data encoded in symbol 70 is a retinal eye pattern, fingerprint or handprint data, such identifying data would be obtained from the customer using an appropriate scanner. The computer would then electronically compare the identifying data derived from the symbol with the identifying data obtained from the customer to determine whether the credit card purchase should be approved or disapproved.

While the embodiment of the invention illustrated in FIG. 4 has been disclosed in its application to approving credit card sales transactions, it will be appreciated that the apparatus has other applications where it is important to verify that the carrier of a card is in fact the authorized holder of the card. For example, card 72 may be an identification badge used to control access to security sensitive areas.

Symbol-Encoded Business Cards

Figure 5:
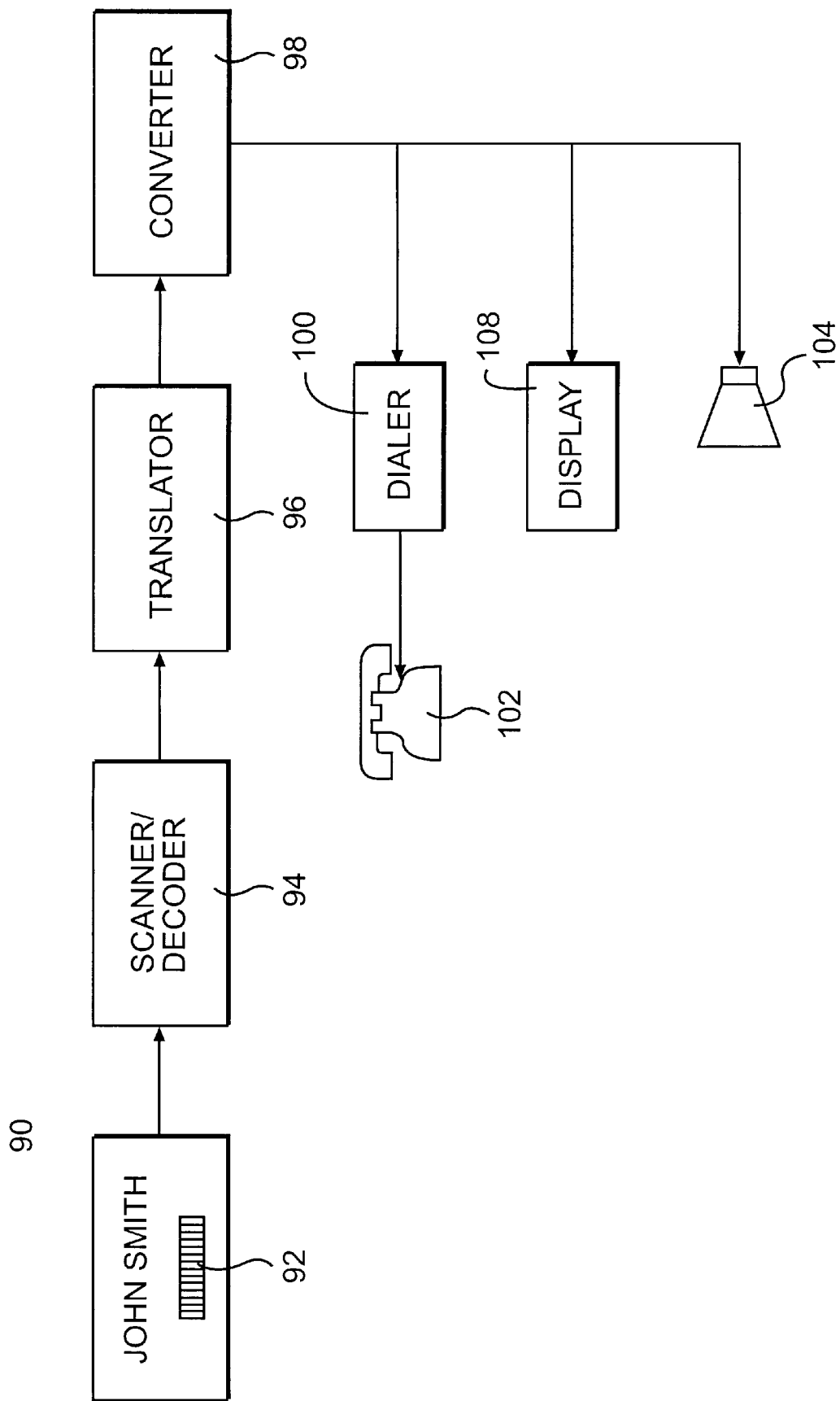
FIG. 5 is a blocked diagram illustrating apparatus constructed in accordance with yet another embodiment of the present invention.

FIG. 5 discloses yet another embodiment of the present invention, wherein the document is in the form of a business card 90. The business card bears a symbol 92, such as a PDF417 two-dimensional bar code symbol, encoded with information pertaining to the person named on the card. For example, symbol 92 may be encoded with a telephone number of the named person, phonetic data representing a pronunciation of the person's name, and/or image data obtained from a photograph or video image of the named person. The business card can then be fed through a scanner/decoder 94 to produce symbol data which is then translated to phone number data, phonetic data, and/or image data by a translator 96.

In the case of phone number data, a converter 98 sends this numerical data to a dialer 100 connected to a telephone 102 to initiate a phone call to the person named on the business card 90. In the case of phonetic data, converter 98 converts this data to analog signals for driving a speaker 104 (or to a digital format appropriate for driving a voice synthesizer) to produce a audio pronunciation of the name printed on the business card. Alternatively, or in addition, image data decoded from symbol 92 is converted by converter 98 to drive signals for a liquid crystal display 108, such as to generate a display of a photographic image of the person named on the business card.

It will be apparent to those skilled in the art that various modifications and variations can be made in the method and apparatus of the present invention without departing from the spirit or scope of the invention. Thus, it is intended that the present invention cover modifications and variations of the invention disclosed herein, provided they come within the scope of the appended claims and their equivalents.

We claim:

1. Apparatus for processing information from an original document containing document information on a first portion of the original document and a graphic symbol on a second portion of the original document physically separated from the first document portion, the graphical symbol encoding data representing the original document information, said apparatus comprising, in combination:

a scanner/decoder for scanning the symbol to produce symbol data;

a translator for translating the symbol data to document information data;

means for converting the document information data into humanly intelligible information different in form from the document information;

an editing system connected to receive the document information data from the translator and produce edited document information data;

an edited document information data translator for translating the edited document information data to edited symbol data; and a printer for printing the edited document information data as edited document information on an edited document and printing the edited symbol data as an edited graphic symbol on the edited document at a single location disassociated from the edited document information printed on the edited document.

2. The apparatus defined in claim 1, wherein the document is a sheet of music, the document information is a musical score printed on the music sheet, and said converting means includes means for producing an audio rendition of the musical score.

3. The apparatus defined in claim 1, wherein the graphic symbol is a two-dimensional bar code symbol.

4. The apparatus defined in claim 3, wherein the graphic symbol is a PDF417 bar code symbol.

5. Apparatus for processing text printed on a first portion of an original paper sheet using a graphic symbol printed on a second portion of the original paper sheet physically separated from the first paper sheet portion and encoded to represent the printed text, said apparatus comprising, in combination:

a scanner/decoder for scanning the symbol to produce symbol data;

a translator for translating the symbol data to text data;

means for converting the text data into a vocal reading of the printed text;

an editing system connected to receive the text data from the translator and produce edited text data;

an edited text data translator for translating the edited text data to edited symbol data; and a printer for printing the edited symbol data as an edited graphic symbol on an edited paper sheet at a single location disassociated from printed text on the edited paper sheet.

6. The apparatus defined in claim 5, wherein the text data is in the form of phonetic data.

7. The apparatus defined in claim 1, wherein the original document is an authorization card, the document information is a representation of a signature of an authorized holder of the card, and said means for converting includes means for enabling a composition of the signature of the authorized holder of the card with a signature executed by a presenter of the card.

8. The apparatus defined in claim 1, wherein the original document is a card, the document information includes address information printed on the card, and said means for converting includes means for directing a communication to an addressee identified by the address information.

9. The apparatus defined in claim 1, wherein the original document is a card, the document information includes image data obtained from a pictorial image of a person named on the card, and said means for converting includes a screen for displaying a likeness of the named person.

10. The apparatus defined in claim 1, wherein the original document is a card, the document information data is phonetic data, and said means for converting includes audio means for reproducing the phonetic data as a voice pronunciation of a name of a person named on the card.

* * * * *